3,103,501
POLY-α-OLEFINS CONTAINING ALKYLIDENE-BISPHENOLS AND BUTYLATED HYDROXY TOLUENE
Newton H. Shearer, Jr., and Frederick B. Joyner, Kingsport, Tenn., assignors to Eastman Kodak Company, Rochester, N.Y., a corporation of New Jersey
No Drawing. Filed Aug. 11, 1960, Ser. No. 48,808
17 Claims. (Cl. 260—45.95)

This invention relates to new poly-α-olefin compositions, and particularly poly-α-olefins prepared from α-olefins having at least three carbon atoms.

Poly-α-olefins such as polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, often times expose the poly-α-olefin to elevated temperatures. To minimize oxidative deterioration in poly-α-olefins, anti-oxidants or stabilizers are often times incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel poly-α-olefin compositions containing synergistic combinations of compounds that improve the stability of the poly-α-olefin compositons against deterioration resulting from exposure to elevated temperatures.

Other objects of the invention will be apparent from the description and claims that follow.

The present invention comprises poly-α-olefin compositions having incorporated therein a stabilizer combination of 2,6-di-tertiary butyl-4-methylphenol and certain alkylidenebisphenols.

The stabilizer components comprising the present synergistic combinations are well-known compounds.

The 2,6-di-tertiary butyl-4-methylphenol stabilizer component is often times called "butylated hydroxy toluene," or simply, "BHT." This latter term will also be used herein to refer to 2,6-di-tertiary butyl-4-methylphenol for convenience.

The alkylidenebisphenol stabilizer components are 2,2'-alkylidenebisphenols and 4,4'-alkylidenebisphenols having the formulas

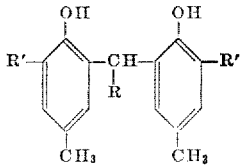

and

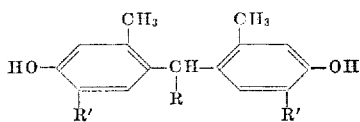

wherien R is a hydrogen atom or an alkyl radical having 1 to 3 carbon atoms and wherien R' is a tertiary hydrocarbon radical having 4 to 7 carbon atoms. Preferred substituents for R' are tetrtiary butyl radicals and 1-methylcyclohexyl radicals.

The combination of the described alkylidenebisphenols and BHT can be used to stabilize a wide variety of solid poly-α-olefin compositions against deterioration resulting from exposure to elevated temperatures. Any of the normally solid polymers of α-monoolefinic hydrocarbons containing 3 to 12 carbon atoms can be stabilized in accordance with the invention. The subject stabilizer combinations can be used in the stabilization of such poly-α-olefins as polypropylene, poly(3-methylbutene-1), poly(4-methylpentene-1), poly(pentene-1), poly(3,3-dimethylbutene-1), poly(4,4-dimethylpentene-1), poly(octene-1), poly(decene-1), poly(3-cyclohexylbutene-1), polystrene, poly(allylcyclohexane), poly(allylcyclopentane), poly(allylbenzene), poly(4-phenylbutene-1), poly(3-ethylheptene-1), poly(5-methylhexene-1), poly(6-methylheptene-1), poly(3-vinyl-2,2,-dimethylnorcamphane), poly(3,5,5-trimethylhexene-1), and the like. Reference is made to copending applications Coover U.S. Serial No. 711,139 filed January 29, 1958, now abandoned and Coover et al. U.S. Serial No. 724,904 filed March 31, 1958, now abandoned, with regard to the preparation of various poly-α-olefin compositions that can be stabilized against thermal degradation in accordance with the invention. The additive stabilizer combinations of the invention are especially useful for stabilzing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 1,000 to 12,000.

The amount of the combination of the alkylidenebisphenol and BHT employed in poly-α-olefin compositions in accordance with the invention can be widely varied, the stabilizing amount of this combination usually varying with the particular use to which the poly-α-olefin compositions are to be put. Concentrations of at least .001% of each stabilizer component of the subject stabilizer combination are siutable, although .001% to 5% for each stabilizer component is generally used, and with about .005% to 3% for each stabilizer component being preferred, the concentration being based on the weight of the poly-α-olefin. We generally utilize the combination of the subject stabilizers at a weight ratio of the alkylidenebisphenol to BHT in the range of 1/100 to 100/1, and preferably 1/50 to 50/1.

The stabilizer combinations of the invention can be incorporated or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions. The subject additives have good compatibility with the subject poly-α-olefin substrates.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments, fibers and other shaped articles, including the widely used films or sheets of the polymers about .5 to 100 mils in thickness. The present compositions can be used for coating paper, wire, metal foil, glass fiber fabrics, synthetic and natural textiles or fabrics, and other such materials.

The stabilizer combinations of the subject alkylidene-bisphenols and BHT are synergistic combinations, namely, the stabilizing effect of such combinations in poly-α-olefins is substantially greater than the additive effect of the individual stabilizers of the combination.

Organic phosphites such as triphenyl phosphite, di(2-ethylhexyl) hydrogen phosphite, diphenyl hydrogen phosphite, mono(p-1,1,3,3-tetramethyl butyl phenyl) phosphite, trilauryl phosphite and the like can be used in conjunction with the subject stabilizer combinations if desired.

The invention is illustrated by the following examples of preferred embodiments thereof. In the following examples the stability of the various poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002 N sodium thiosulfate. The peroxide concentration, P, in milliequivalents per kilogram of polymer is given by the expression, $P=8S$, where S is the number of milliliters of 0.002 N sodium thiosulfate used.

EXAMPLE 1

A 100 g. sample of plastic grade solid polypropylene having a density of about .912, an inherent viscosity in tetralin at 145° C. of 3.15, an average molecular weight greater than 15,000 and an oven storage life as determined above of less than one hour was slurried with an acetone solution containing 0.075 g. of 2,6-di-tertiary butyl-4-methylphenol, 0.025 g. of 4,4'-butylidenebis(5-methyl-2-tertiary butyl phenol) and 0.05 g. of trilauryl phosphite. The acetone was allowed to evaporate leaving the additives substantially uniformly dispersed on the particles of polypropylene. The resulting mixture was homogenized by tumbling for 8 hours. The resulting polypropylene composition was then molded into a plate and subjected to the oven storage test described above. The oven storage life was found to be 12 hours. Omitting the trilauryl phosphite did not substantially alter the oven life of the polymer. Omitting the 2,6-di-tertiary butyl-4-methylphenol reduced the oven storage life to 2.5 hours, and omitting the 4,4'-n-butylidenebis(5-methyl-2-tertiary butylphenol) reduced the oven storage life to about 1 hour. This stability data is summarized in Table 1 below.

*Table 1*

| Additive [1] | Oven life at 160° C., hours |
| --- | --- |
| (1) None | 1 |
| (2) 0.075% BHT | 1 |
| (3) 0.025% 4,4'-n-butylidenebis(5-methyl-2-tertiary butylphenol) | 2.5 |
| (4) 0.075% BHT+0.025% 4,4'-n-butylidenebis(5-methyl-2-tertiary butylphenol) | 12 |

[1] A 0.05% portion of trilauryl phosphite was also present.

As can be observed from the data set out in Table 1, the combination of BHT and 4,4'-n-butylidenebis(5-methyl-2-tertiary butylphenol) is a synergistic combination, the stabilizing effect of this combination being substantially more than the additive stabilizing effect of the components of the combination. Similar synergism in the stabilization of the polypropylene results when 4,4'-methylenebis(5-methyl-2-tertiary butylphenol) or 4,4'-methylenebis[5-methyl-2-(1-methylcyclohexyl) phenol] is substituted for the 4,4'-n-butylidenebis(5-methyl-2-tertiary butylphenol) component.

EXAMPLE 2

Several stabilizer combinations of the invention were evaluated with respect to stability by the method described in Example 1 and above in solid polypropylene as described in Example 1, solid poly(4-methylpentene-1), solid poly(3-methylbutene-1) and solid poly(3,5,5-trimethylhexene-1). The poly(3-methylbutene-1) had an average molecular weight of about 15,000 and a density of about .90. The poly(4-methylpentene-1) had an average molecular weight of about 15,000 and a density of about .83. The poly(3,5,5-trimethylhexene) had an average molecular weight of about 12,000. Samples including no stabilizer additive and single components of the present stabilizer combinations were also included in the oven life stability evaluations. The results of the stability evaluations are summarized by the data set out in Table 2 below. The concentrations of the stabilizer are based on the weight of the poly-α-olefin.

*Table 2*

| Additive | Poly-α-olefin | Oven Life at 160° C., Hours |
| --- | --- | --- |
| (1) None | (¹) | <1 |
| (2) 0.1% 4,4'-n-butylidenebis (5-methyl-2-tertiary butylphenol) | polypropylene | 9 |
| (3) 2.9% BHT | do | 21 |
| (4) 0.1% 4,4'-n-butylidenebis (5-methyl-2-tertiary butylphenol) +2.9% BHT | do | 87 |
| (5) 0.01% 2,2'-methylenebis(4-methyl-6-tertiary butyl-phenol) | do | 1 |
| (6) 0.19% BHT | do | <2 |
| (7) 0.01% 2,2'-methylenebis(4-methyl-6-tertiary butyl-phenol) +0.19% BHT | do | 6 |
| (8) 0.004% 2,2'-methylenebis[4-methyl-6-(1-methylcyclohexyl)phenol] | do | 0.2 |
| (9) 0.001% BHT | do | <0.2 |
| (10) 0.004% 2,2'-methylenebis [4-methyl-6-(1-methyl-cyclohexyl) phenol] +0.001% BHT | do | 1 |
| (11) 0.1% 2,2'-n-butylidene bis(4-methyl-6-tertiary butylphenol) +0.1% BHT | poly(4-methyl-pentene-1) | 14 |
| (12) 0.025% 2,2'-methylenebis[4-methyl-6-(1-methyl-cyclohexyl) phenol] +0.075% BHT | poly(3-methyl-butene-1) | 15 |
| (13) 0.5% BHT | poly(3,5,5-trimethylhexene-1) | 3 |
| (14) 0.3% 2,2'-methylenebis(4-methyl-6-tertiary butylphenol) | do | 42 |
| (15) 0.3% 2,2'-methylenebis (4-methyl-6-tertiary butylphenol) +0.5% BHT | do | >150 |
| (16) 0.3% BHT | do | 2 |
| (17) 0.1% 4,4'-methylenebis(5-methyl-2-tertiary butylphenol) | do | 17 |
| (18) 0.1% 4,4'-methylenebis(5-methyl-2-tertiary butylphenol) +0.3% BHT | do | 61 |

¹ Polypropylene, poly(4-methylpentene-1), poly(3-methylbutene-1), or poly(3,5,5-trimethylhexene).

As illustrated by the data set out in the above table, a wide variety of combinations of poly-α-olefins can be suitably stabilized with the stabilizer combination of the invention.

The present invention thus provides novel poly-α-olefin compositions having improved stability against deterioration resulting from exposure to elevated temperatures, and particularly, it provides novel synergistic stabilizer combinations for poly-α-olefin compositions.

Although the invention has been described in detail with reference to preferred embodiments thereof, it will

We claim:

1. A solid poly-α-olefin composition comprising a solid poly-α-olefin prepared from an α-olefinic hydrocarbon having 3 to 12 carbon atoms containing a stabilizer combination comprising at least about .001% by weight based on said poly-α-olefin of 2,6-di-tertiary butyl-4-methylphenol and at least about .001% by weight based on said poly-α-olefin of an alkylidenebisphenol selected from the group consisting of compounds having the formulas

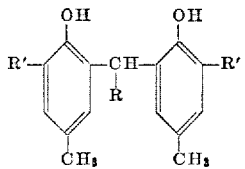

and

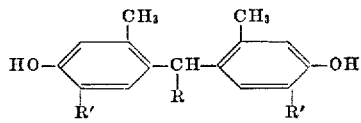

wherein R is selected from the group consisting of hydrogen atoms and alkyl radicals having 1 to 3 carbon atoms and wherein R' is a tertiary hydrocarbon radical having 4 to 7 carbon atoms.

2. A solid poly-α-olefin composition comprising a solid poly-α-olefin selected from the group consisting of polypropylene, poly(4-methylpentene-1), poly(3-methylbutene-1) and poly(3,5,5-trimethylhexene-1) containing a stabilizer combination comprising about .001% to 5% by weight based on said poly-α-olefin of 2,6-di-tertiary butyl-4-methylphenol and about .001% to 5% by weight based on said poly-α-olefin of an alkylidenebisphenol selected from the group consisting of compounds having the formulas

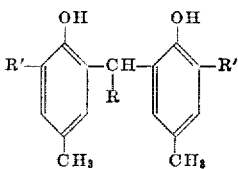

and

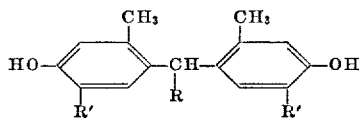

wherein R is selected from the group consisting of hydrogen atoms and alkyl radicals having 1 to 3 carbon atoms and wherein R' is a tertiary hydrocarbon radical having 4 to 7 carbon atoms.

3. A solid poly-α-olefin composition comprising solid polypropylene containing a stabilizer combination comprising about .001% to 5% by weight based on said polypropylene of 2,6-di-tertiary butyl-4-methylphenol and about .001% to 5% by weight based on said polypropylene of a compound having the formula

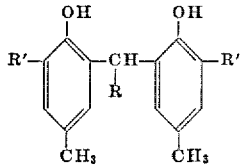

wherein R is selected from the group consisting of hydrogen atoms and alkyl radicals having 1 to 3 carbon atoms and wherein R' is a tertiary hydrocarbon radical having 4 to 7 carbon atoms.

4. A solid poly-α-olefin composition comprising solid polypropylene containing a stabilizer combination comprising about .001% to 5% by weight based on said polypropylene of 2,6-di-tertiary butyl-4-methylphenol and about .001% to 5% by weight based on said polypropylene of a compound having the formula

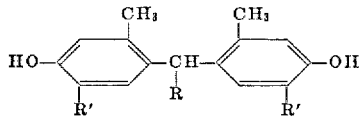

wherein R is selected from the group consisting of hydrogen atoms and alkyl radicals having 1 to 3 carbon atoms and wherein R' is a tertiary hydrocarbon radical having 4 to 7 carbon atoms.

5. A solid poly-α-olefin composition comprising solid poly(4-methylpentene-1) containing a stabilizer combination comprising about .001% to 5% by weight based on said poly(4-methylpentene-1) of 2,6-di-tertiary butyl-4-methylphenol and about .001% to 5% by weight based on said poly(4-methylpentene-1) of a compound having the formula

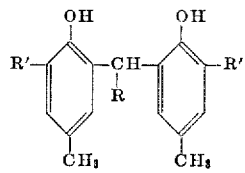

wherein R is selected from the group consisting of hydrogen atoms and alkyl radicals having 1 to 3 carbon atoms and wherein R' is a tertiary hydrocarbon radical having 4 to 7 carbon atoms.

6. A solid poly-α-olefin composition comprising solid poly(4-methylpentene-1) containing a stabilizer combination comprising about .001% to 5% by weight based on said poly(4-methylpentene-1) of 2,6-di-tertiary butyl-4-methylphenol and about .001% to 5% by weight based on said poly(4-methylpentene-1) of a compound having the formula wherein R is selected from the group consisting of hydrogen atoms and alkyl radicals having 1 to 3 carbon atoms and wherein R' is a tertiary hydrocarbon radical having 4 to 7 carbon atoms.

7. A solid poly-α-olefin composition comprising solid poly(3-methylbutene-1) containing a stabilizer combination comprising about .001% to 5% by weight based on said poly(3-methylbutene-1) of 2,6-di-tertiary butyl-4-methylphenol and about .001% to 5% by weight based on poly(3-methylbutene-1) of a compound having the formula

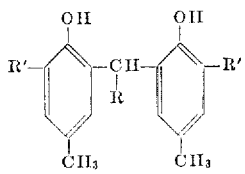

wherein R is selected from the group consisting of hydrogen atoms and alkyl radicals having 1 to 3 carbon atoms and wherein R' is a tertiary hydrocarbon radical having 4 to 7 carbon atoms.

8. A solid poly-α-olefin composition comprising solid poly(3-methylbutene-1) containing a stabilizer combination comprising about .001% to 5% by weight based on said poly(3-methylbutene-1) of 2,6-di-tertiary butyl-4-methylphenol and about .001% to 5% by weight based on said poly(3-methylbutene-1) of a compound having the formula

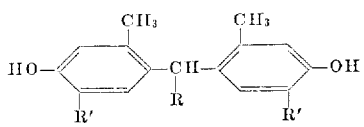

wherein R is selected from the group consisting of hydrogen atoms and alkyl radicals having 1 to 3 carbon atoms and wherein R' is a tertiary hydrocarbon radical having 4 to 7 carbon atoms.

9. A solid poly-α-olefin composition comprising solid poly(3,5,5-trimethylhexene-1) containing a stabilizer combination comprising about .001% to 5% by weight based on said poly(3,5,5-trimethylhexene-1) of 2,6-di-tertiary butyl-4-methylphenol and about .001% to 5% by weight based on said poly(3,5,5-trimethylhexene-1) of a compound having the formula

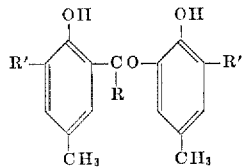

wherein R is selected from the group consisting of hydrogen atoms and alkyl radicals having 1 to 3 carbon atoms and wherein R' is a tertiary hydrocarbon radical having 4 to 7 carbon atoms.

10. A solid poly-α-olefin composition comprising solid poly(3,5,5-trimethylhexene-1) containing a stabilizer combination comprising about .001% to 5% by weight based on said poly(3,5,5-trimethylhexene-1) of 2,6-di-tertiary butyl-4-methylphenol and about .001% to 5% by weight based on said poly(3,5,5-trimethylhexene-1) of a compound having the formula

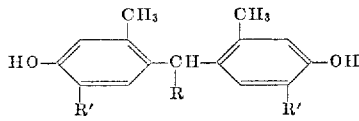

wherein R is selected from the group consisting of hydrogen atoms and alkyl radicals having 1 to 3 carbon atoms and wherein R' is a tertiary hydrocarbon radical having 4 to 7 carbon atoms.

11. A solid poly-α-olefin composition comprising solid polypropylene containing a stabilizer combination comprising about .005% to 3% by weight based on said polypropylene of 2,6-di-tertiary butyl-4-methylphenol and about .005% to 3% by weight based on said polypropylene of 4,4' - n - butylidenebis(5 - methyl - 2-tertiary butylphenol).

12. A solid poly-α-olefin composition comprising solid polypropylene containing a stabilizer combination comprising about .005% to 3% by weight based on said polypropylene of 2,6-di-tertiary butyl-4-methylphenol and about .005% to 3% by weight based on said polypropylene of 2,2' - methylenebis(4 - methyl - 6 - tertiary butylphenol).

13. A solid poly-α-olefin composition comprising solid polypropylene containing a stabilizer combination comprising about .005% to 3% by weight based on said polypropylene of 2,6-di-tertiary butyl-4-methylphenol and about .005% to 3% by weight based on said polypropylene of 2,2' - methylenebis[4 - methyl - 6 - (1-methylcyclohexyl)phenol].

14. A solid poly-α-olefin composition comprising solid poly(4-methylpentene-1) containing a stabilizer combination comprising about .005% to 3% by weight based on said poly(4-methylpentene-1) of 2,6-di-tertiary butyl-4-methylphenol and about .005% to 3% by weight based on said poly(4-methylpentene-1) of 2,2'-n-butylidenebis(4-methyl-6-tertiary butylphenol).

15. A solid poly-α-olefin composition comprising solid poly(3-methylbutene-1) containing about .005% to 3% by weight based on said poly(3-methylbutene-1) of 2,6-di-tertiary butyl-4-methylphenol and about .005% to 3% by weight based on said poly(3-methylbutene-1) of 2,2'-methylenebis[4-methyl-6-(1-methylcyclohexyl)phenol].

16. A solid poly-α-olefin composition comprising solid poly(3,5,5-trimethylhexene-1) containing a stabilizer combination comprising about .005% to 3% by weight based on said poly(3,5,5-trimethylhexene-1) of 2,6-di-tertiary butyl-4-methylphenol and about .005% to 3% by weight based on said poly(3,5,5-trimethylhexene-1) of 2,2'-methylenebis(4-methyl-6-tertiary butylphenol).

17. A solid poly-α-olefin composition comprising solid poly(3,5,5-trimethylhexene-1) containing a stabilizer combination comprising about .005% to 3% by weight based on said poly(3,5,5-trimethylhexene-1) of 2,6-di-tertiary butyl-4-methylphenol and about .005% to 3% by weight based on said poly(3,5,5-trimethylhexene-1) of 4,4'-methylenebis(5-methyl-2-tertiary butylphenol).

References Cited in the file of this patent

UNITED STATES PATENTS

| | | |
|---|---|---|
| 2,985,617 | Salyer et al. | May 23, 1961 |
| 2,999,842 | Csendes et al. | Sept. 12, 1961 |
| 3,000,854 | Favre | Sept. 19, 1961 |

FOREIGN PATENTS

| | | |
|---|---|---|
| 785,314 | Great Britain | Oct. 23, 1957 |
| 1,171,286 | France | Sept. 29, 1958 |

OTHER REFERENCES

Chevassus et al.: "La Stabilisation des Chlorures de Polyvinyle," Amphora, Paris, publisher (1957) p. 129.

UNITED STATES PATENT OFFICE
CERTIFICATE OF CORRECTION

Patent No. 3,103,501                              September 10, 1963

Newton H. Shearer, Jr., et al.

It is hereby certified that error appears in the above numbered patent requiring correction and that the said Letters Patent should read as corrected below.

Column 7, lines 38 to 44, the formula should appear as shown below instead of as in the patent:

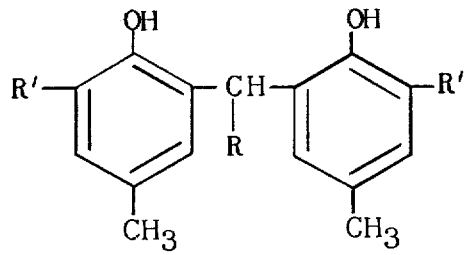

Signed and sealed this 12th day of May 1964.

(SEAL)
Attest:

ERNEST W. SWIDER                                EDWARD J. BRENNER
Attesting Officer                              Commissioner of Patents